United States Patent
Bredthauer et al.

Patent Number: 6,142,679
Date of Patent: Nov. 7, 2000

[54] CONNECTOR FOR OPTICAL WAVEGUIDES

[75] Inventors: Falko Bredthauer, Minden; Roland Berg, Höxter, both of Germany

[73] Assignee: Ratio-Plast-Optoelectronics GmbH, Loehne, Germany

[21] Appl. No.: 09/377,938

[22] Filed: Aug. 20, 1999

Related U.S. Application Data

[63] Continuation of application No. PCT/DE98/00477, Feb. 18, 1998.

[30] Foreign Application Priority Data

Feb. 20, 1997 [DE] Germany .......................... 197 06 927

[51] Int. Cl.⁷ ...................................................... G02B 6/36
[52] U.S. Cl. .................................. 385/87; 385/53; 385/86
[58] Field of Search .................................. 385/53, 83, 87, 385/86

[56] References Cited

U.S. PATENT DOCUMENTS

| | | | |
|---|---|---|---|
| 5,222,169 | 6/1993 | Chang et al. | 385/87 |
| 5,644,673 | 7/1997 | Patterson | 385/138 |
| 5,671,310 | 9/1997 | Lin et al. | 385/78 |

*Primary Examiner*—Rodney Bovernick
*Assistant Examiner*—Ellen E. Kim
*Attorney, Agent, or Firm*—Herbert L. Lerner; Laurence A. Greenberg; Werner H. Stemer

[57] ABSTRACT

A fiber optics cable waveguide connector for fiber optics cables having an outer casing, a strain relief element, an optical inner casing and an optical waveguide includes a clamping nut having a thread, an outer casing clamping device engageable with the outer casing, an inner sleeve, a strain relief element clamping device engageable with the strain relief element, an optical waveguide clamping device engageable with the optical waveguide, a press-on sleeve having a thread for releasably securing the press-on sleeve and the clamping nut together and for providing a clamping force when the clamping nut and the press-on sleeve are screwed together, a ferrule connected to the press-on sleeve, and a union nut connected to the ferrule. The clamping force arising from the fastening of the clamping nut to the press-on sleeve causes the outer casing clamping device to engage the outer casing, the strain relief element clamping device to engage the strain relief element, and the optical waveguide clamping device to engage the waveguide. Also, the clamping force releasably connects the clamping nut, the outer casing clamping device, the inner sleeve, the strain relief element clamping device, the optical waveguide clamping device, the press-on sleeve, the ferrule and the union nut together to each other.

9 Claims, 3 Drawing Sheets

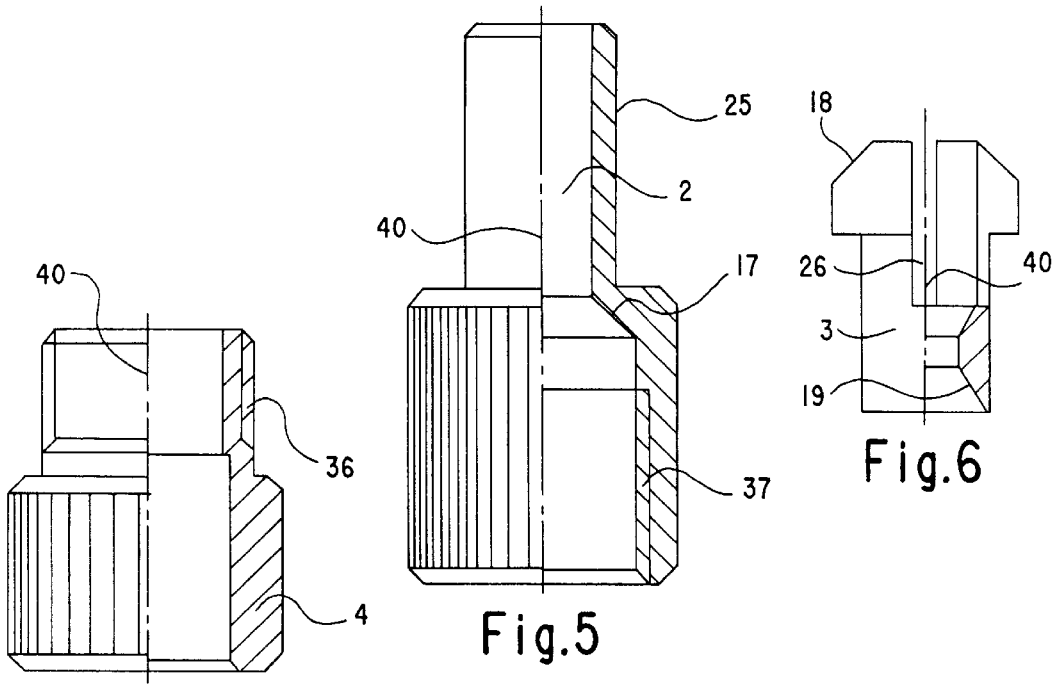
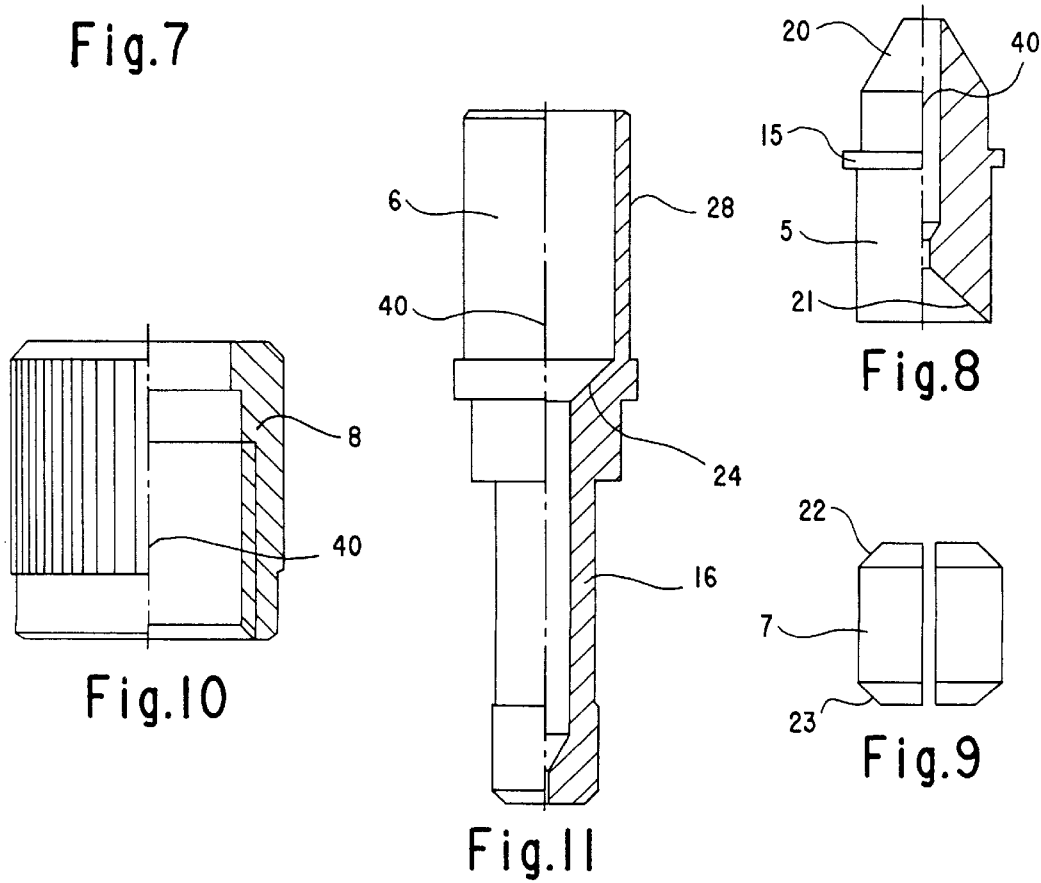

CONNECTOR FOR OPTICAL WAVEGUIDES

CROSS-REFERENCE TO RELATED APPLICATION

This is a continuation of copending International Application No. PCT/DE98/00477, filed Feb. 18, 1998, which designated the United States.

BACKGROUND OF THE INVENTION

Field of the Invention

The invention lies in the field of optical fiber technology. The invention relates to a connector for fiber optics cables.

An optical waveguide connector is known from German Published, Patent Application DE 35 33 433, in which an optical fiber cable (which usually includes an outer casing, a strain relief element, an optical inner casing and the glass-fiber optical waveguide that is guided in the center) is fixed in place by plastic deformation of a crimping sleeve disposed on the optical waveguide connector.

A drawback of the prior art optical waveguide connector, as with all other connectors for optical waveguides, is that it is a one-time device. In other words, it can only be fitted once to a glass-fiber cable. If the connector does not achieve the desired properties at the first fitting (i.e., acceptable coupling loss), it must be detached from the cable and disposed of as scrap.

The prior art connectors solve the problem of fastening the strain relief element fiber in various ways. The fiber is either adhesively bonded within the connector or is permanently fastened to the connector by compressing a plastic part or small lead tube. In other prior art connectors, the strain relief element is non-releasably crimped to the cable casing. A further drawback of the conventional connector type mounting is the requirement for adhesives or special tools (such as, for example, two-component adhesives, mixing aids, syringes with cannulas for filling the connector with adhesive, heater boxes for curing the adhesive, or crimping tools and other pressure devices for the plastic deformation of the crimping sleeves). Each of these connection types is extremely complex and requires a high degree of care from the person performing the work. Accordingly, the way a person performs the work on a day-to-day basis is reflected on the end result of the work. Variation in a person's skill causes a large number of improperly attached connectors, each of which must be discarded.

A further prior art device for connecting an optical waveguide to an optical lens is disclosed in British Patent Application No. GB 2,097,149 A. The device uses a screw thread for attaching the optical fiber cable casing. The device can be fixed to the cable casing by plastically deforming the casing through the screw thread. The tightening of a securing part causes the direct clamping of the optical waveguide. At the same time, the strain relief element is clamped indirectly, applying a torsional stress to the optical waveguide itself. However, torsional stresses to optical waveguides should be avoided under all circumstances.

SUMMARY OF THE INVENTION

It is accordingly an object of the invention to provide a connector for optical waveguides, which overcomes the hereinafore-mentioned disadvantages of the heretofore-known devices of this general type and which is reusable and can be connected to the end of an optical fiber cable without the need for using a special tool, such connection generating only radial holding forces.

With the foregoing and other objects in view, there is provided, in accordance with the invention, a connector for fiber optics cable having an outer casing, a strain relief element, an optical inner casing and an optical waveguide, including: a clamping nut having a thread; an outer casing clamping device engageable with the outer casing of the fiber optics cable; an inner sleeve; a strain relief element clamping device engageable with the strain relief element of the fiber optics cable; an optical waveguide clamping device engageable with the optical waveguide of the fiber optics cable; a press-on sleeve having a thread for releasably securing the press-on sleeve and the clamping nut together and for providing a clamping force when the clamping nut and the press-on sleeve are screwed together; a ferrule connected to the press-on sleeve; and a union nut connected to the ferrule, the clamping force provided when the clamping nut and the press-on sleeve are screwed together causing the outer casing clamping device to engage the outer casing of the fiber optics cable, the strain relief element clamping device to engage the strain relief element of the fiber optics cable, and the optical waveguide clamping device to engage the optical waveguide of the fiber optics cable, and the clamping force releasably connecting the clamping nut, the outer casing clamping device, the inner sleeve, the strain relief element clamping device, the optical waveguide clamping device, the press-on sleeve, the ferrule and the union nut together.

The connector according to the invention then can be mounted on an optical fiber cable, in particular on a glass-fiber cable, by tightening a single clamping nut, without adhesively bonding the fibers of the cable or crimping the outer casing of the cable. The clamping system in the connector allows the three cable components, i.e., the cable casing, the strain relief element and the optical waveguide, to be mechanically fixed simultaneously. The releasable clamping connections insure connector removability and reusability. Furthermore, the elimination of adhesive bonding and crimping renders unnecessary use of all tools that have hitherto been required. The preparation of the optical fiber cable end faces may be carried out as performed previously, i.e., the protruding fiber on the connection side of the connector is slit open and broken off or ground down and polished.

The novel connector is reusable and does not have to be thrown away. If, after installation, the connector does not possess the required optical properties, it can be simply dismantled to attempt refitting and can be refitted to the same cable after the insulation has been re-stripped from the optical fiber cable. Fitting the connector requires no special tool; entirely eliminating expensive purchases of tools and heater boxes, in particular for users who fit only a small number of cables. Furthermore, the novel connector saves time when fitting. For example, with respect to adhesive bonding, all the work required for mixing the adhesive and applying the adhesive between the glass fiber and the connector, and the time spent waiting for the adhesive to cure is eliminated. With respect to crimping, all the operations involved are eliminated.

Significant is the fact that the strain relief element fibers are clamped into the connector separately, generating an additional tensile stress with respect to the outer casing. Such clamping insures that the fibers or the Kevlar® yarn of the strain relief element immediately absorb all tensile forces that arise, rather than leaving the outer casing of the optical fiber cable to absorb those forces.

Another advantage of the connector of the invention is that it simplifies handling during fitting because all three clamping locations are simultaneoulsy engaged by tightening a single, common clamping nut. The connector of the invention provides a further advantage in that the plurality of elements of the clamping system are disposed in an adjustable but captive position in a single holding area of the ferrule through the press-on sleeve. Accordingly, the connector generally includes only three separate parts, not including the anti-kink cover.

In accordance with a further feature of the invention, the outer casing clamping device is a clamping piece, the ferrule has conical inner surfaces, the inner sleeve is configured as a pressure sleeve and has a conical inner surface, the optical waveguide clamping device includes at least two partially cylindrical clamping pieces each of the clamping pieces having two conically shaped ends, one of the conically shaped ends bearing against the conical inner surfaces of the ferrule and the other of the conically shaped ends bearing against the conical inner surface of the inner sleeve, and the inner sleeve and the strain relief element indirectly receive an axial pressure from the clamping piece through the clamping force for engaging the outer casing.

In accordance with an added feature of the invention, the connector has a longitudinal axis and the at least two partially cylindrical clamping pieces are two semi-cylindrical clamping pieces that together define a central axis coexistent with the longitudinal axis and each of which have a V-shaped recess disposed along the central axis and two thin contact lines against which the optical waveguide is held.

In accordance with an additional feature of the invention, the connector has a longitudinal axis and the at least two partially cylindrical clamping pieces are three partial-cylinder clamping pieces, each of the clamping pieces forming one-third of a cylinder and having a flattened tip directed toward the longitudinal axis such that the optical waveguide is held at the longitudinal axis along the three flattened tips between the three partial-cylinder clamping pieces.

In accordance with yet another feature of the invention, the ferrule has holding area having an internal opening defining an internal opening diameter, the press-on sleeve and the at least two partially cylindrical clamping pieces are slidably engageable with the holding area and the inner sleeve has an annular flange with an external diameter that is slightly smaller than the internal opening diameter of the holding area, the press-on sleeve slidably mounting the inner sleeve within the internal opening of the holding area.

In accordance with yet a further feature of the invention, the clamping nut has an inner cone and the clamping piece has two ends, one of the two ends remote from the inner sleeve having a conical shape and an axial slit and bearing against the inner cone of the clamping nut such that when the clamping nut is releasably secured on the press-on sleeve and generates the clamping force, the clamping piece elastically deforms along the longitudinal axis in the direction of the inner sleeve to securely clamp the outer casing of the optical fiber cable within the connector.

In accordance with yet an added feature of the invention, the clamping piece has a conical clamping inner surface corresponding to the conical inner surface of the inner sleeve, the conical angle with respect to the longitudinal axis of the connector formed by the corresponding conical surface between the conical clamping inner surface and the conical inner surface of the inner sleeve being less than the conical angles formed by the conical inner surfaces of the ferrule, the two conically shaped ends of the at least two partially cylindrical clamping pieces, the inner cone of the clamping nut, or the one of the two ends of the clamping piece remote from the inner sleeve with respect to the longitudinal axis of the connector.

In accordance with yet an additional feature of the invention, the outer casing clamping device is immediately adjacent the outer casing of the optical fiber cable, the strain relief element clamping device is immediately adjacent the outer casing clamping device and the optical waveguide clamping device is immediately adjacent the strain relief element clamping device within the connector.

In accordance with a concomitant feature of the invention, the strain relief element clamping device is disposed between the outer casing clamping device and optical waveguide clamping device.

Other features that are considered as characteristic for the invention are set forth in the appended claims.

Although the invention is illustrated and described herein as embodied in a connector for optical waveguides, it is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is a partially sectional view of the clamping nut of FIGS. 1 and 3;

FIG. 6 is a partially sectional view of the clamping piece of FIGS. 1 and 3 for the outer casing and strain relief element of the optical fiber cable;

FIG. 7 is a partially sectional view of the press-on sleeve of FIGS. 1 and 3;

FIG. 8 is a partially sectional view of the pressure sleeve of FIGS. 1 and 3;

FIG. 9 is a view of the two clamping pieces of FIGS. 1 and 3 for the optical waveguide;

FIG. 10 is a partially sectional view of the union nut of FIGS. 1 and 3; and FIG. 11 is a partially sectional view of the ferrule of FIGS. 1 and 3.

DESCRIPTION OF THE PREFERRED EMBODIMENTS

Figure 1:
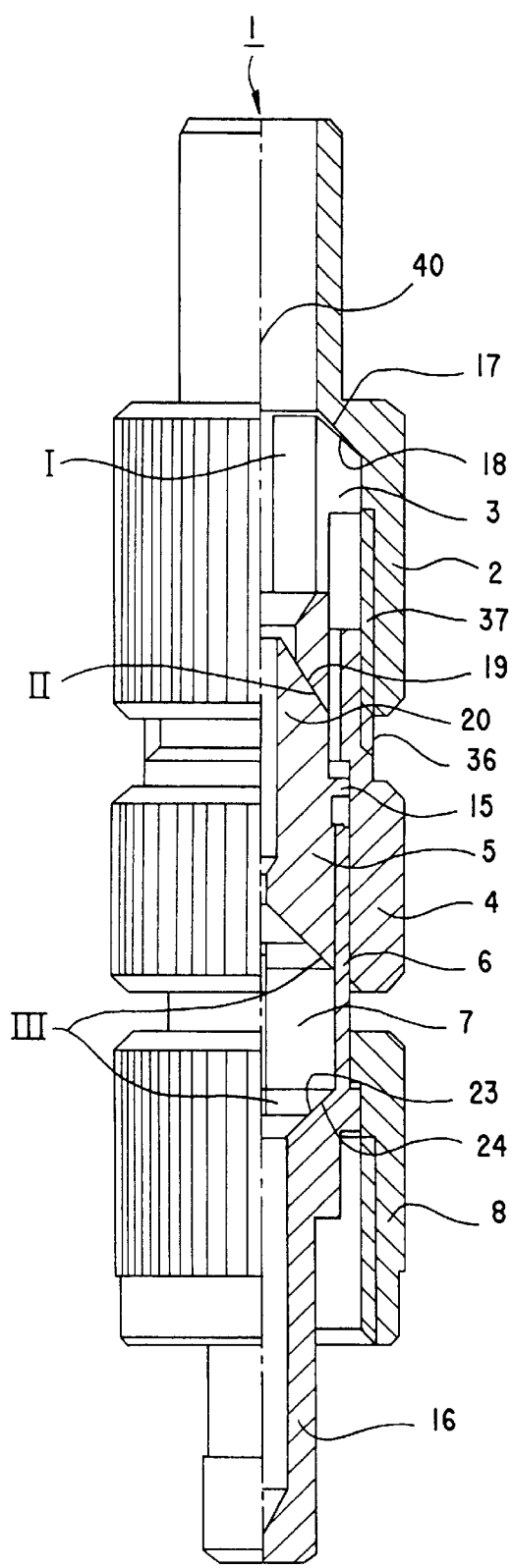
FIG. 1 is a partially sectional view of a connector according to the invention in the fastened position.
Figure 2:
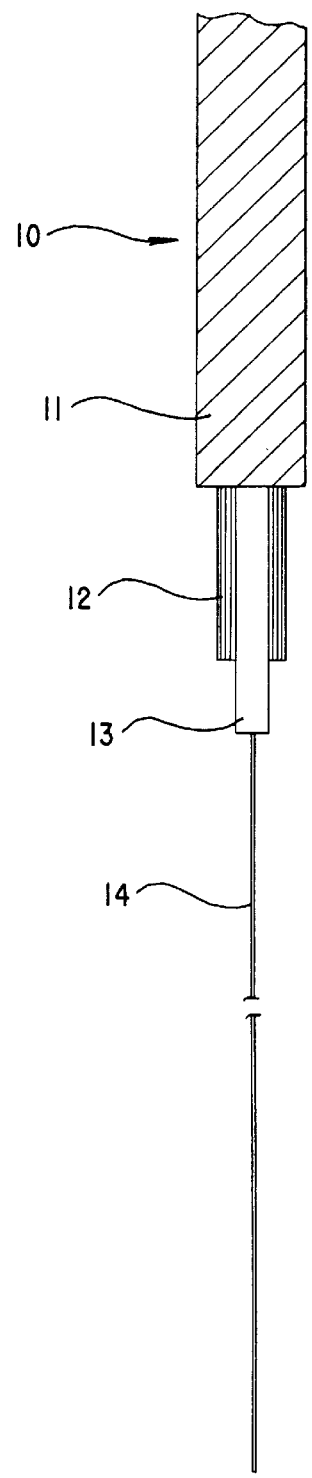
FIG. 2 is a diagrammatic, elevational view of an optical fiber cable from which the insulation has been stripped.

Referring now to the figures of the drawings in detail and first, particularly to FIG. 1 thereof, there is seen a connector 1 configured for an optical fiber cable 10 with an external diameter of the outer casing 11 of 3 mm, with a strain relief element 12 surrounding an inner casing 13, and an optical waveguide 14 with a glass-fiber diameter of 200/230 μm. The strain relief element 12 is preferably made of Kevlar® yarn.

Figures 3, 4:
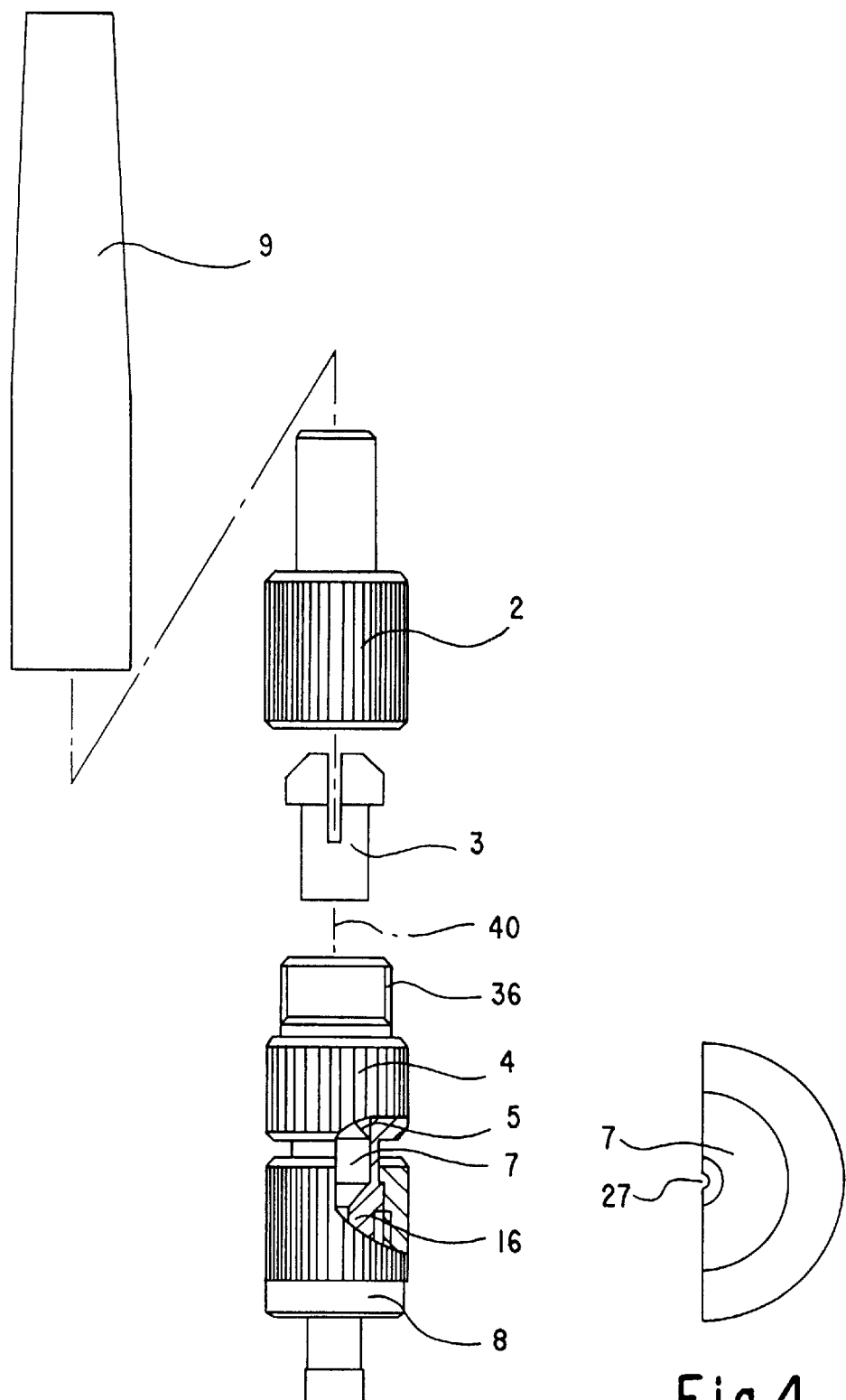
FIG. 3 is a partly exploded, partly broken away view of the individual parts of the connector components of FIG. 1.
FIG. 4 is an enlarged plan view of one of the two clamping pieces of FIGS. 1 and 3.

The connector 1 includes a clamping nut 2 (FIGS. 3 and 5) with a hollow-cylindrical end section 25 for receiving an anti-kink cover 9 (FIG. 3), a clamping piece 3 (FIGS. 3 and 6) for the outer casing 11 and the strain relief element 12, a press-on sleeve 4 (FIGS. 3 and 7), an inner sleeve 5 (FIGS. 3 and 8), a ferrule 16 (FIGS. 3 and 11) with a holding area 28, two clamping pieces 7 (FIGS. 3, 4, and 9) for the optical waveguide 14, and a union nut 8 (FIGS. 3 and 10) for fixing the connector 1 to an optical interface.

In addition to the end section 25, the clamping nut 2 has an internal cone 17, which is of corresponding configuration to an external cone 18 of the clamping piece 3 for the outer casing 11.

The clamping piece 3 has axial incisions 26, so that when the clamping nut 2 is tightened, the free internal diameter of the clamping piece 3 can be elastically reduced. On its opposite side, the clamping piece 3 has an internal cone 19, which, in turn, is of corresponding configuration to an external cone 20 of the inner sleeve 5, the Kevlar yarn used for the strain relief element 12 being clamped in between these two conical surfaces. When the clamping nut 2 is tightened and the clamping piece 3 is pushed onto the inner sleeve 5, the Kevlar yarn is subjected to a tensile stress with respect to the outer casing 11 of the optical fiber cable 10, such that tensile forces exerted when the cable is used are immediately absorbed by the strain relief element 12 rather than the outer casing 11, or possibly even the optical waveguide 14. On the side of the inner sleeve 5 opposite from the external cone 20 of the inner sleeve 5 is a further internal cone 21 that interacts with a first set of external cones 22 of the two clamping pieces 7, both of which have a semi-cylindrical configuration and have a V-shaped groove 27 (FIG. 4) along the longitudinal axis 40 of the connector 1 (which is coexistent with the central cylindrical axis defined by the two clamping pieces 7) for holding the optical waveguide 14. The V-shaped groove 27 of each of the two clamping pieces 7 provide two thin contact lines against which the optical waveguide (14) is held. At the opposite end of the two clamping pieces 7, there is a further set of external cones 23 corresponding with the internal cone 24 in the ferrule 16.

Alternatively, the two clamping pieces 7 can be replaced by three partial-cylinder clamping pieces (not illustrated in further detail). Each of the three partial-cylinder clamping pieces form one-third of a cylinder and have a flattened tip directed toward the longitudinal axis 40 such that the optical waveguide (14) is held at the longitudinal axis 40 by the three flattened tips between the three partial-cylinder clamping pieces.

The clamping pieces 7 for the optical waveguide 14 and the inner sleeve 5 are mounted in the holding area 28 of the ferrule 16.

The press-on sleeve 4 is fitted onto the ferrule 16 in a form-fitting and/or force-fitting manner with an annular flange 15 (projecting from the inner sleeve 5) preventing the inner sleeve 5 from falling out of the outer sleeve 6 of the ferrule 16 and the press-on sleeve 4. A union nut 8 is held between press-on sleeve 4 and holding area 28 of the ferrule 16 in a freely rotatable manner.

The various internal and external cones of the connector 1 each have a conical shape. The internal cone 19 of the clamping piece 3 and the external cone 20 of the inner sleeve 5 are more sharply angled with respect to the longitudinal axis 40 of the connector 1 than the other conical surfaces to reliably insure clamping of the strain relief element 12.

In order to fit a connector 1, the insulation is suitably removed from an optical fiber cable 10. Then, the rear clamping nut 2 of the connector 1 is unscrewed from the press-on sleeve 4 (through the clamping nut thread 37 and the press-on sleeve thread 36) and the loose clamping piece 3 for the outer casing 11 and the strain relief element 12 is removed from the connector 1. The optical fiber cable 10 is fitted through the anti-kink cover 9 and the rear clamping nut 2, respectively. Alternatively, the anti-kink cover 9 can be fitted onto the cable 10 before the insulation is removed from the cable 10. Next, the clamping piece 3 is pushed onto the optical fiber cable 10 until it comes to a stop. When pushing the clamping piece 3, it is necessary to insure that the Kevlar yarn of the strain relief element 12 is also fully guided through the clamping piece 3. The optical fiber cable 10, together with the clamping nut 2 and the clamping piece 3, is then introduced into the front part of the connector 1, which includes the press-on sleeve 4, the inner sleeve 5, the clamping pieces 7, the ferrule 16, and the union nut 8, until it comes to a stop. The inner sleeve 5 and the clamping pieces 7 are as yet unclamped and can move freely. If the insulation has been removed appropriately, the glass fiber, i.e., the optical waveguide 14, projects about 20 mm out of the ferrule 16. Next, the clamping nut 2 is tightened upon the press-on sleeve thread 36 through the clamping nut thread 37. As a result of the clamping nut 2 being tightened on the screw thread 36 of the press-on sleeve 4, a radial pressure is exerted on the internal parts of the connector 1, including the clamping piece 3, the inner sleeve 5 and the clamping pieces 7. The radial pressure produces a simultaneous and threefold clamping action on the optical waveguide 14, the Kevlar yarn of the strain relief element 12 and the outer casing 11 of the optical fiber cable 10.

Finally, the anti-kink cover 9, which has previously been pulled onto the optical fiber cable 10, is pushed onto the clamping nut 2 until it comes to a stop. The end faces of the optical waveguide 14 are prepared using standard procedures.

We claim:

1. A connector for fiber optics cable with an outer casing, a strain relief element, an optical inner casing and an optical waveguide, the connector comprising:

a clamping nut having a thread;

an outer casing clamping device engageable with an outer casing of the fiber optics cable;

an inner sleeve;

a strain relief element clamping device engageable with a strain relief element of the fiber optics cable;

an optical waveguide clamping device engageable with an optical waveguide of the fiber optics cable;

a press-on sleeve having a thread for releasably securing said press-on sleeve and said clamping nut together and for providing a clamping force when said clamping nut and said press-on sleeve are screwed together;

a ferrule connected to said press-on sleeve; and a union nut connected to said ferrule, the clamping force provided when said clamping nut and said press-on sleeve are screwed together causing said outer casing clamping device to engage the outer casing of the fiber optics cable, said strain relief element clamping device to engage the strain relief element of the fiber optics cable, and said optical waveguide clamping device to engage the optical waveguide of the fiber optics cable, and the clamping force releasably connecting said clamping nut, said outer casing clamping device, said inner sleeve, said strain relief element clamping device, said optical waveguide clamping device, said press-on sleeve, said ferrule and said union nut together.

2. The connector according to claim 1, wherein said outer casing clamping device is a clamping piece, said ferrule has conical inner surfaces, said inner sleeve is configured as a pressure sleeve and has a conical inner surface, said optical waveguide clamping device includes at least two partially cylindrical clamping pieces each of said clamping pieces having two conically shaped ends, one of said conically shaped ends bearing against said conical inner surfaces of the ferrule and the other of said conically shaped ends bearing against said conical inner surface of said inner sleeve, and said inner sleeve and the strain relief element indirectly receive an axial pressure from said clamping piece through the clamping force for engaging the outer casing.

3. The connector according to claim 2, wherein the connector has a longitudinal axis and said at least two partially cylindrical clamping pieces are two semi-cylindrical clamping pieces that together define a central axis coexistent with the longitudinal axis and each of which have a V-shaped recess disposed along said central axis and two thin contact lines against which the optical waveguide is held.

4. The connector according to claim 2, wherein the connector has a longitudinal axis and said at least two partially cylindrical clamping pieces are three partial-cylinder clamping pieces, each of said clamping pieces forming one-third of a cylinder and having a flattened tip directed toward the longitudinal axis such that the optical waveguide is held at the longitudinal axis along said three flattened tips between said three partial-cylinder clamping pieces.

5. The connector according to claim 2, wherein said ferrule has holding area having an internal opening defining an internal opening diameter, said press-on sleeve and said at least two partially cylindrical clamping pieces are slidably engageable with said holding area and said inner sleeve has an annular flange with an external diameter that is slightly smaller than said internal opening diameter of said holding area, said press-on sleeve slidably mounting said inner sleeve within said internal opening of said holding area.

6. The connector according to claim 2, wherein said clamping nut has an inner cone and said clamping piece has two ends, one of said two ends remote from said inner sleeve having a conical shape and an axial slit and bearing against said inner cone of the clamping nut such that when said clamping nut is releasably secured on said press-on sleeve and generates said clamping force, said clamping piece elastically deforms along the longitudinal axis in the direction of said inner sleeve to securely clamp the outer casing of the fiber optics cable within the connector.

7. The connector according to claim 6, wherein said clamping piece has a conical clamping inner surface corresponding to said conical inner surface of said inner sleeve, the conical angle with respect to the longitudinal axis of the connector formed by the corresponding conical surface between said conical clamping inner surface and said conical inner surface of said inner sleeve being less than the conical angles formed by said conical inner surfaces of said ferrule, said two conically shaped ends of said at least two partially cylindrical clamping pieces, said inner cone of said clamping nut, or said one of said two ends of said clamping piece remote from said inner sleeve with respect to the longitudinal axis of the connector.

8. The connector according to claim 1, wherein said outer casing clamping device is immediately adjacent the outer casing of the fiber optics cable, said strain relief element clamping device is immediately adjacent said outer casing clamping device and said optical waveguide clamping device is immediately adjacent said strain relief element clamping device within the connector.

9. The connector according to claim 1, wherein said strain relief element clamping device is disposed between said outer casing clamping device and optical waveguide clamping device.

\* \* \* \* \*